US012779643B2

(12) United States Patent
Kumar et al.

(10) Patent No.: US 12,779,643 B2
(45) Date of Patent: Nov. 3, 2026

(54) SPRING COMPRESSION APPARATUS

(71) Applicant: Rivian IP Holdings, LLC, Irvine, CA (US)

(72) Inventors: Rajinal Ravneet Kumar, Irvine, CA (US); Peter Langel, Carlsbad, CA (US)

(73) Assignee: Rivian IP Holdings, LLX, Irvine, CA (US)

( * ) Notice: Subject to any disclaimer, the term of this patent is extended or adjusted under 35 U.S.C. 154(b) by 486 days.

(21) Appl. No.: 18/344,824

(22) Filed: Jun. 29, 2023

(65) Prior Publication Data

US 2025/0001568 A1 Jan. 2, 2025

(51) Int. Cl.
*B25B 27/30* (2006.01)

(52) U.S. Cl.
CPC ...... *B25B 27/304* (2013.01); *B60G 2206/921* (2013.01)

(58) Field of Classification Search
CPC ... B25B 27/0035; B25B 27/023; B25B 27/30; B25B 27/302; B25B 27/304; B25B 27/308; Y10T 29/53613; Y10T 29/53622; Y10T 29/53635; Y10T 29/53865; Y10T 29/53883
See application file for complete search history.

(56) References Cited

U.S. PATENT DOCUMENTS 1,449,551 A * 3/1923 Rock .......................... B25B 27/26
254/105

FOREIGN PATENT DOCUMENTS

DE 202011107229 U1 * 5/2012 ........... B25B 27/304
FR 1065796 A * 5/1954

* cited by examiner

*Primary Examiner* — Tyrone V Hall, Jr.
(74) *Attorney, Agent, or Firm* — Patterson + Sheridan, L.L.P.—Rivian

(57) ABSTRACT

The present disclosure relates to compression apparatus and compression systems, and related components and methods, for manufacturing and servicing operations. In one or more embodiments, a compression apparatus for vehicle sub-frames includes a first block, a second block spaced from the first block, a first connector extending between the first block and the second block, and a second connector extending between the first block and the second block. The compressions apparatus includes a drive assembly extending through the second block. The drive assembly includes a drive shaft comprising a head section, a threaded section, and an end section, the threaded section disposed between the head section and the end section. The drive assembly includes a drive cap coupled to the drive shaft.

18 Claims, 8 Drawing Sheets

SPRING COMPRESSION APPARATUS

INTRODUCTION

Vehicles commonly include suspension systems having one or more springs that may need servicing or replacement. Such maintenance typically requires a significant amount of force to be applied to the spring to facilitate removal from the vehicle, which may necessitate complex and expensive equipment.

SUMMARY

The present disclosure relates to compression apparatus and compression systems, and related components and methods, for manufacturing and servicing operations.

In one or more embodiments, a compression apparatus for vehicle subframes includes a first block, a second block spaced from the first block, a first connector extending between the first block and the second block, and a second connector extending between the first block and the second block. The compression apparatus includes a drive assembly extending through the second block. The drive assembly includes a drive shaft comprising a head section, a threaded section, and an end section, the threaded section disposed between the head section and the end section. The drive assembly includes a drive cap coupled to the drive shaft.

In one or more embodiments, a system for compressing a vehicle subframe includes a first apparatus and a second apparatus. The first apparatus includes a pair of first blocks spaced from each other, a plurality of first connectors extending between the pair of first blocks, a first drive assembly, and a first engagement plate. The first drive assembly includes a first drive shaft and a first drive cap coupled to the first drive shaft. The first drive shaft includes a first head section, a first threaded section, and a first end section. The first threaded section is disposed between the first head section and the first end section. The first engagement plate is received in a first retention opening formed in one of the first blocks. The first engagement plate includes a first alignment interface aligned along a first direction. The second apparatus includes a pair of second blocks spaced from each other, a plurality of second connectors extending between the pair of second blocks, a second drive assembly, and a second engagement plate. The second drive assembly includes a second drive shaft and a second drive cap coupled to the second drive shaft. The second drive shaft includes a second head section, a second threaded section, and a second end section. The second threaded section is disposed between the second head section and the second end section. The second engagement plate is received in a second retention opening formed in one of the second blocks. The second engagement plate includes a second alignment interface aligned along a second direction that is non-parallel to the first direction.

In one or more embodiments, a method of manipulating a vehicle subframe includes positioning a first block to abut an engagement plate received in the first block against a first outer frame surface of a first frame component. A first connector and a second connector are coupled to the first block. The method includes positioning a second block to extend the first connector and the second connector through the second block and space the second block from the first block. The method includes coupling the first connector and the second connector to the second block, and turning a drive assembly that extends through the second block to abut a drive cap of the drive assembly against a second outer frame surface of a second frame component.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The present disclosure relates to compression apparatus and compression systems, and related components and methods, for manufacturing and servicing operations. In one or more embodiments, a system for compressing a vehicle subframe includes one or more apparatus. The one or more apparatus can respectively include a pair of blocks spaced from each other, a plurality of connectors extending between the pair of blocks, a drive assembly, and an engagement plate. The one or more apparatus are positioned along one or more locations of the vehicle subframe, with portions of the subframe being disposed between the pair of blocks and between the connectors of the respective apparatus.

The drive assemblies of the respective apparatus can be turned to drive (e.g., compress) frame surfaces of the vehicle subframe to each other, which can bias (e.g., compress) a leaf spring interfacing with portions of the vehicle subframe. Compressing the leaf spring can remove forces from fasteners that are fastened to the vehicle subframe such that the fasteners can be disassembled with reduced or eliminated chances of potential energy stored in the spring being converted into kinetic energy of fastener components. For example, turning of the drive assemblies can compress the leaf spring and disengage portions of the vehicle subframe from nuts (and/or hex heads of bolts) of fasteners, removing spring forces from the nuts (and/or hex heads of bolts) and reducing or eliminating the chances that potential energy of the spring will convert to kinetic energy in the nuts and/or the bolts.

In one or more embodiments, the vehicle subframe is a subframe of an automotive vehicle, such as an electric vehicle (for example an electric delivery van). In one or more embodiments, the vehicle subframe is configured to support a suspension system and/or wheels.

The disclosure contemplates that terms used herein such as “couples,” “coupling,” “couple,” and “coupled” may include but are not limited to welding, fusing, melting together, interference fitting, and/or fastening such as by using bolts, threaded connections, pins, and/or screws. The disclosure contemplates that terms such as “couples,” “coupling,” “couple,” and “coupled” may include but are not limited to integrally forming. The disclosure contemplates that terms such as “couples,” “coupling,” “couple,” and “coupled” may include but are not limited to direct coupling and/or indirect coupling, such as indirect coupling through components such as links, blocks, and/or frames.

Figure 1:
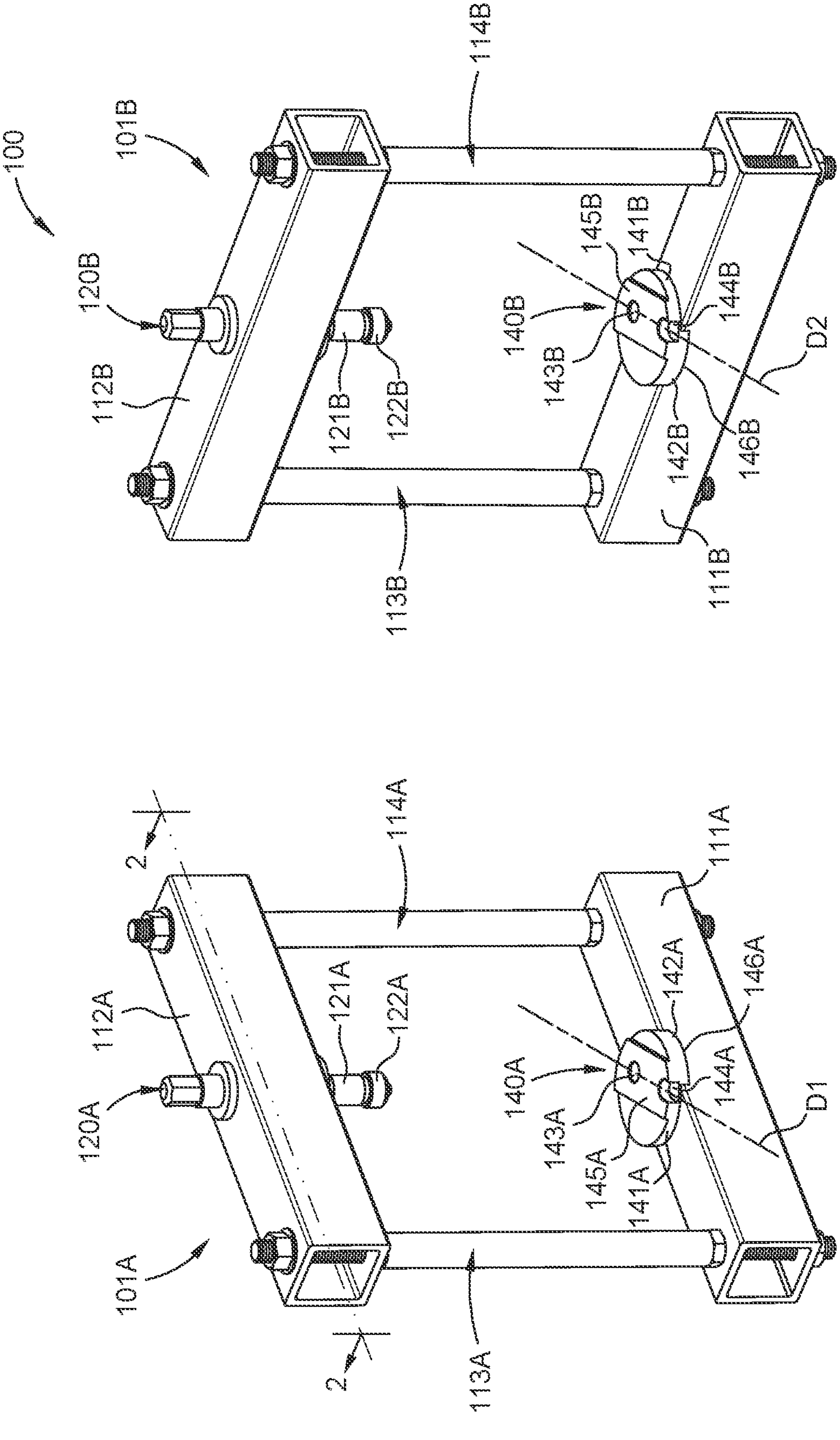
FIG. 1 is a schematic partial axonometric view of a system for compressing a vehicle subframe, the system including a first apparatus and a second apparatus, according to one or more embodiments.

FIG. 1 is a schematic partial axonometric view of a system 100 for compressing a vehicle subframe, according to one or more embodiments. The system 100 includes a first apparatus 101A and a second apparatus 101B. The present disclosure contemplates that the first apparatus 101A and the second apparatus 101B can be oriented angularly relative to each other approximately as shown in FIG. 1 when aligned relative to the vehicle subframe to compress the vehicle subframe. Other orientations are contemplated for the first apparatus 101A and the second apparatus 101B.

The first and second apparatus 101A, 101B respectively include a pair of blocks 111A-111B, 112A-112B spaced from each other, a plurality of connectors 113A-113B, 114A-114B extending between the pair of blocks 111A-111B, 112A-112B, a drive assembly 120A 120B, and an engagement plate 140A, 140B. The respective drive assemblies 120A, 120B include a drive shaft 121A, 121B and a drive cap 122A, 122B coupled to the respective drive shaft 121A, 121B.

The engagement plates 140A, 140B are received respectively in retention openings 146A, 146B formed in the blocks 111A-111B. The engagement plates 140A, 140B respectively include base sections 141A, 141B, first protrusions 142A, 142B extending relative to first sides of the base sections 141A, 141B, second protrusions 145A, 145B extending relative to second sides of the base section 141A, 141B, and openings 143A-144A, 143B-144B formed in the second protrusions 145A, 145B.

The base section 141A, the second protrusion 145A, and the openings 143A-144A of the first apparatus 101A are part of a first alignment interface of the engagement plate 140A. The first alignment interface is oriented along a first direction D1. In one or more embodiments, and as shown in FIG. 1, the second protrusion 145A and the openings 143A-144A of the first apparatus 101A are oriented along the first direction D1. In one or more embodiments, the base sections 141A, 141B are disc sections. Other shapes, such as a rectangle, a square, etc., are contemplated for the base sections 141A, 141B.

The first protrusions 142A, 142B are received respectively in the retention openings 146A, 146B formed in blocks 111A-111B. The respective plurality of openings 143A-144A, 143B-144B include first openings 143A, 143B formed in planar outer surfaces of the second protrusions 145A, 145B, and second openings 144A, 144B are formed in edges of the second protrusions 145A, 145B. In one or more embodiments, the first openings 143A, 143B are circular and the second openings 144A, 144B are semi-circular.

The base section 141B, the second protrusion 145B, and the openings 143B-144B of the second apparatus 101B are part of a second alignment interface of the engagement plate 140B. The second alignment interface is oriented along a second direction D2. The second direction D2 is non-parallel to the first direction D1. In one or more embodiments, and as shown in FIG. 1, the second protrusion 145B and the openings 143B-144B of the second apparatus 101B are oriented along the second direction D2. In one or more embodiments, the second direction D2 is non-parallel to the first direction D1 at least when the first and second blocks 111A, 112A of the first apparatus 101A are oriented parallel to the first and second blocks 111B, 112B of the second apparatus 101B. In one or more embodiments, the first direction D1 and the second direction D2 intersect each other at an angle, such as an oblique angle. The second direction D2 can diverge away from the first direction D1.

Figure 2:
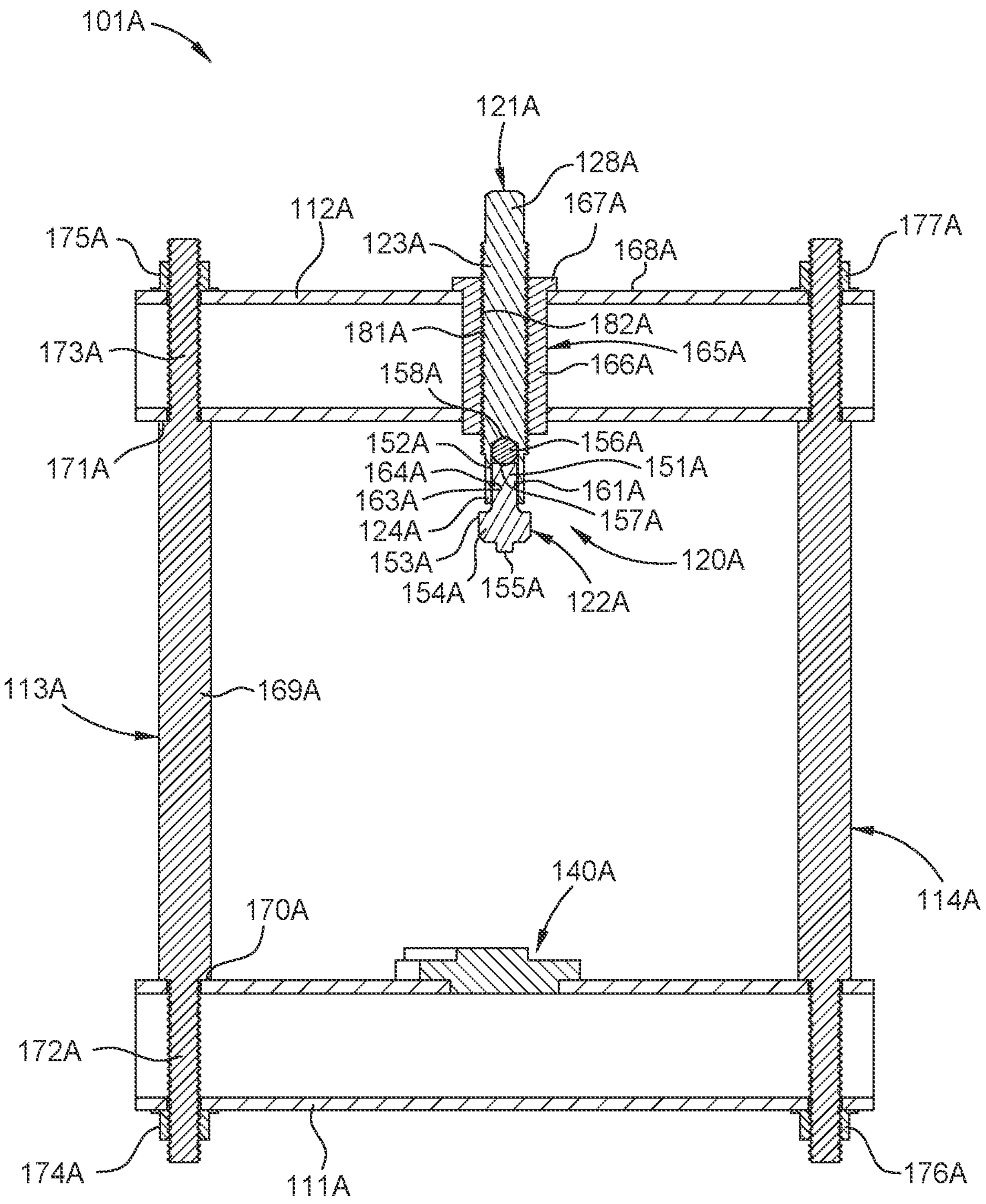
FIG. 2 is a schematic side cross-sectional view, along Section 2-2, of the first apparatus of FIG. 1, according to one or more embodiments.

FIG. 2 is a schematic side cross-sectional view, along Section 2-2, of the first apparatus 101A shown in FIG. 1, according to one or more embodiments. Although the below embodiments are described in conjunction with the first apparatus 101A, the same components can be respectively included in the second apparatus 101B.

The drive shaft 121A includes a head section 128A, a threaded section 123A, and an end section 124A. The threaded section 123A is disposed between the head section 128A and the end section 124A. A second block 112A is spaced from a first block 111A. A first connector 113A extends between the first block 111A and the second block 112A, and a second connector 114A extends between the first block 111A and the second block 112A.

The drive cap 122A includes a shaft section 151A received in a retention opening 152A formed in the end section 124A of the drive shaft 121A, and a head section 153A disposed outside of the retention opening 152A. The head section 153A of the drive cap 122A includes an outer shoulder 154A and a tip 155A protruding relative to the outer shoulder 154A.

The drive assembly 120A includes a ball 156A disposed between a recessed surface 157A of the shaft section 151A of the drive cap 122A and a recessed inner surface 158A of the drive shaft 121A. The drive shaft 121A and the drive cap 122A are rotatable with respect to each other. The drive assembly 120A includes one or more ring segments 161A disposed partially in an inner groove 162A of the end section 124A of the drive shaft 121A and partially in an outer groove 163A of the shaft section 151A of the drive cap 122A. In one or more embodiments, the one or more ring segments 161A include a seal ring, such as a single complete seal ring (for example an O-ring seal). The interface of the one or more ring segments 161A with the inner groove 162A and the outer groove 163A facilitates retaining the ball 156A and the drive cap 122A in the drive shaft 121A while allowing the ball 156A and the drive cap 122A to freely rotate relative to the drive shaft 121A. The interface of the one or more ring segments 161A with the inner groove 162A and the outer groove 163A can facilitate allowing a user to manually disassemble (e.g., by hand) the drive shaft 121A, the ball 156A, the one or more ring segments 161A, and the drive cap 122A from each other. The present disclosure contemplates that, although seal ring(s) may be structurally used as the one or more ring segments 161A (e.g., for retention purposes), the seal ring(s) may not necessarily form a seal between the drive shaft 121A and the drive cap 122A.

The drive assembly 120A includes a retention sleeve 165A. The retention sleeve 165A includes a sleeve section 166A extending through the second block 112A, and an outer shoulder section 167A configured to abut against an outer surface 168A of the second block 112A. In one or more embodiments, each of the first block 111A and the second block 112A includes a hollow frame. The retention sleeve 165A includes a threaded inner surface 181A, and a threaded outer surface 182A of the threaded section 123A of the drive shaft 121A is threaded into the threaded inner surface 181A.

The first connector 113A and the second connector 114A each includes a middle section 169A including a first outer shoulder 170A configured to abut against the first block 111A and a second outer shoulder 171A configured to abut against the second block 112A. The first connector 113A and the second connector 114A each includes a first end section 172A configured to extend through the first block 111A, and a second end section 173A configured to extend through the second block 112A. The first end section 172A and the second end section 173A each have an outer diameter that is smaller than an outer diameter of each of the first outer shoulder 170A and the second outer shoulder 171A. Using a plurality of nuts 174A-177A turned onto the end sections of the connectors 113, 114A, the first connector 113A and the second connector 114A fixedly couple the first block 111A to the second block 112A.

Figure 3A:
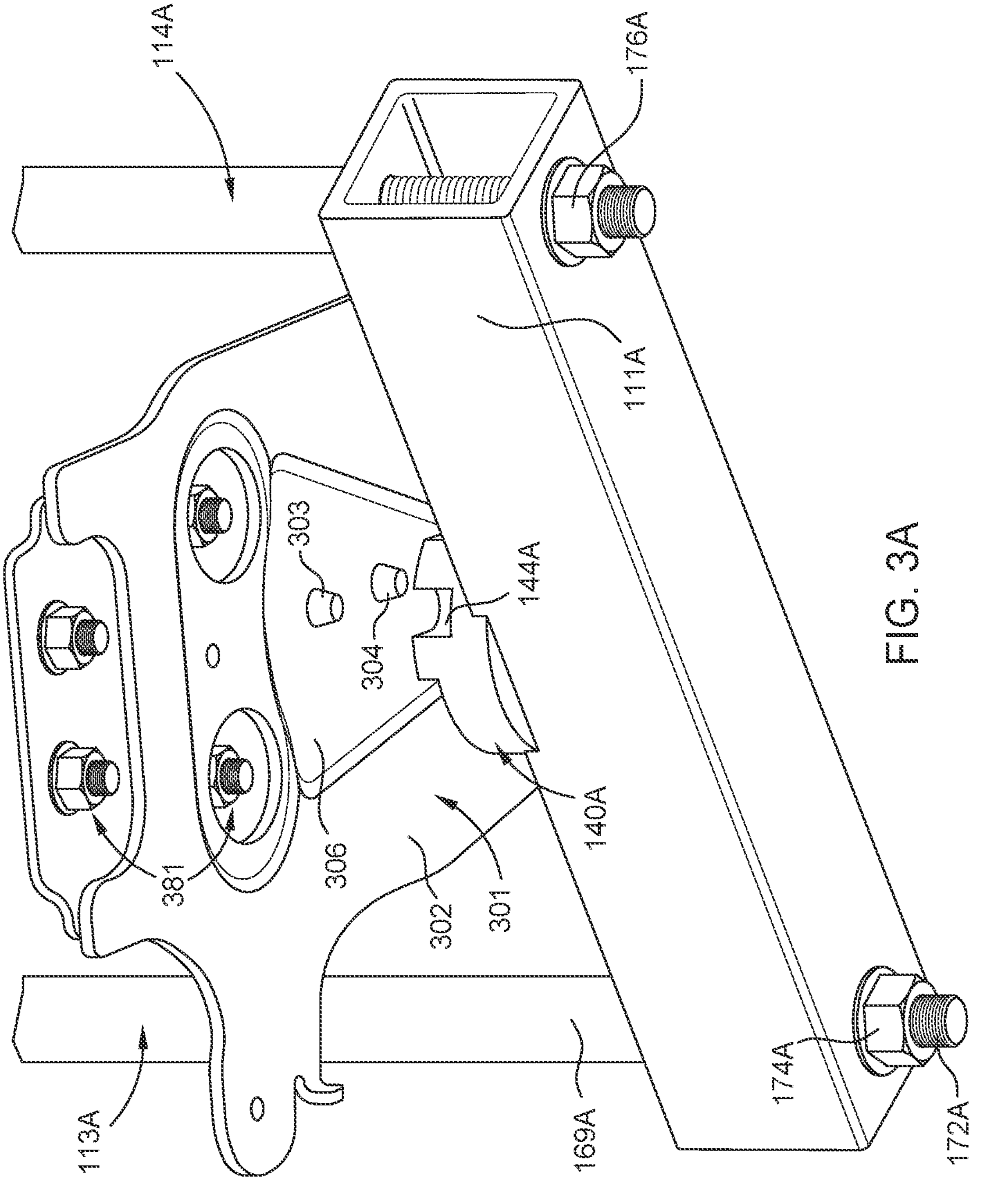
FIGS. 3A-3B and 4A-4B are schematic flow views corresponding to different states of a method of manipulating a vehicle subframe, according to one or more embodiments.

FIGS. 3A-3B and 4A-4B are schematic flow views corresponding to different stages of a method of manipulating a vehicle subframe, according to one or more embodiments. FIG. 3A is a schematic perspective view of the first block 111A and the first and second connectors 113A, 114A coupled to the first block 111A, positioned adjacent to a first frame component 301. The first frame component 301 includes a frame plate 302 and a plurality of protrusions 303, 304 (such as elastomeric pins). The protrusions 303, 304 protrude relative to a recessed surface 306 of the first frame component 301. The first block 111A and the connectors 113A, 114A can be positioned, for example using a person's hand(s). First fasteners 381 are used to couple the first frame component 301 to the vehicle subframe.

Figure 3B:
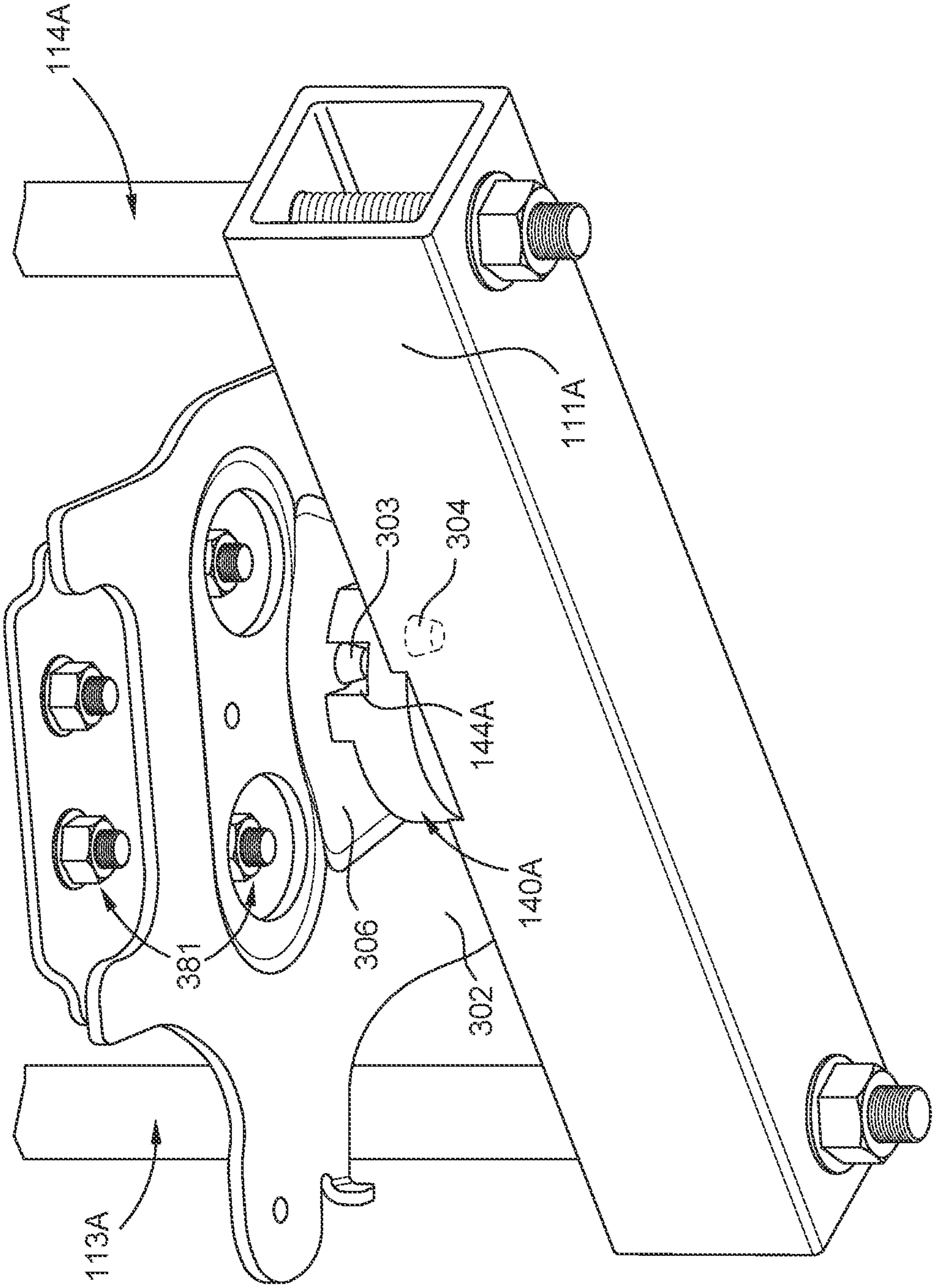

FIG. 3B is a schematic perspective view of the first block 111A and the first and second connectors 113A, 114A coupled to the first block 111A, after the first block 111A is positioned to abut the engagement plate 140A received in the first block 111A against a first outer frame surface (e.g., the recessed surface 306) of the first frame component 301. The positioning of the first block 111A includes receiving the plurality of protrusions 303, 304 of the first frame component 301 in the plurality of openings 143A, 144A formed in the engagement plate 140A. The first block 111A and engagement plate 140A can be positioned, for example using a person's hand(s). Receiving both of the protrusions 303, 304 in both of the openings 143A, 144A facilitates properly aligning the first apparatus 101A relative to the vehicle subframe to facilitate, for example, properly aligning the tip 155A with the opening 403 and/or properly aligning the outer shoulder 154A with the second outer frame surface 402.

Figure 4A:
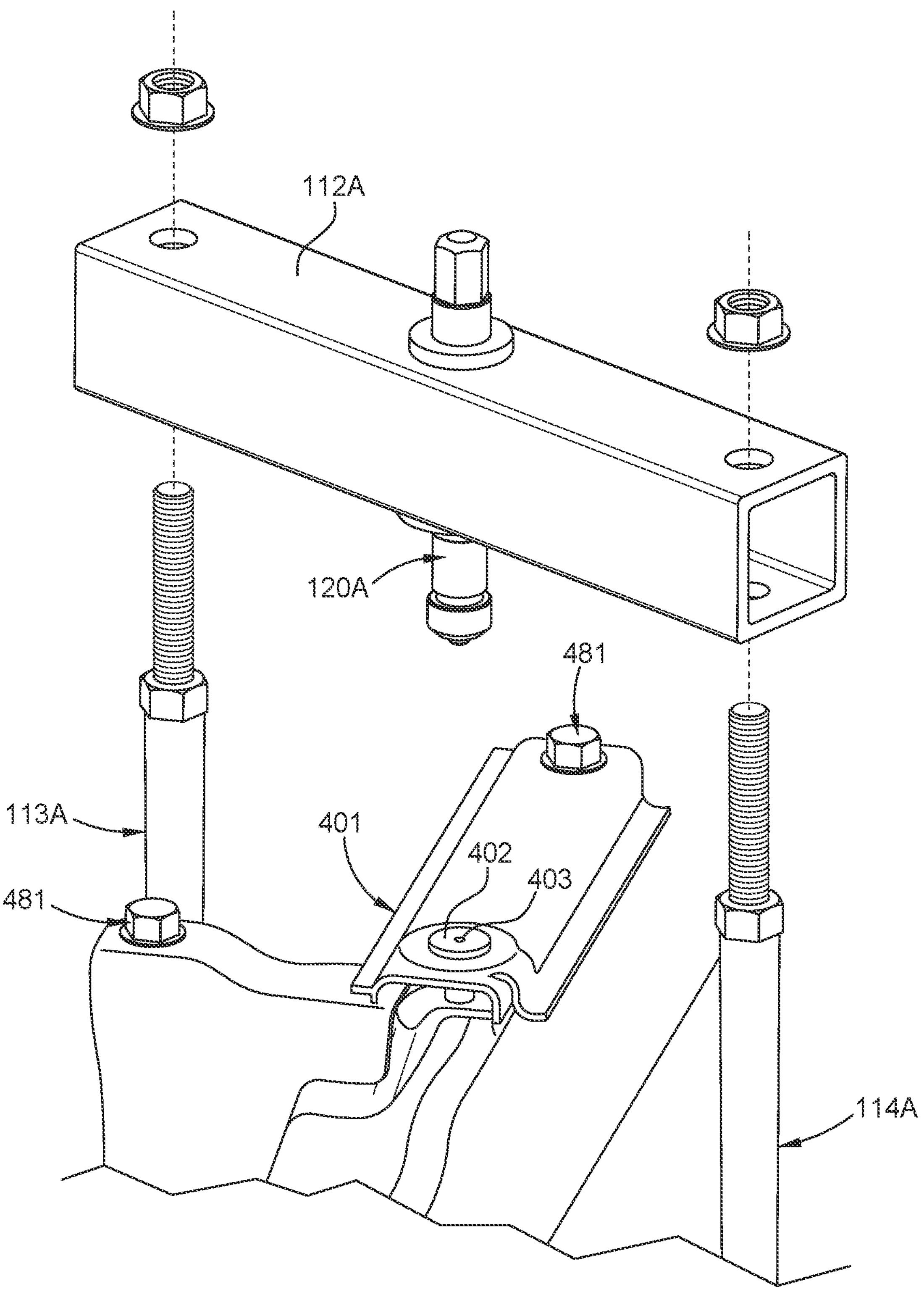

FIG. 4A is a schematic perspective view of the second block 112A, and the drive assembly 120A coupled to the second block 112A, positioned adjacent to the first and second connectors 113A, 114A that are coupled to the first block 111A. The second block 112A is positioned adjacent to a second frame component 401 and adjacent to the connectors 113A, 114A. The second block 112A and the drive assembly 120A can be positioned, for example, using a person's hand(s). Second fasteners 481 are used to couple the second frame component 401 to the vehicle subframe.

Figure 4B:
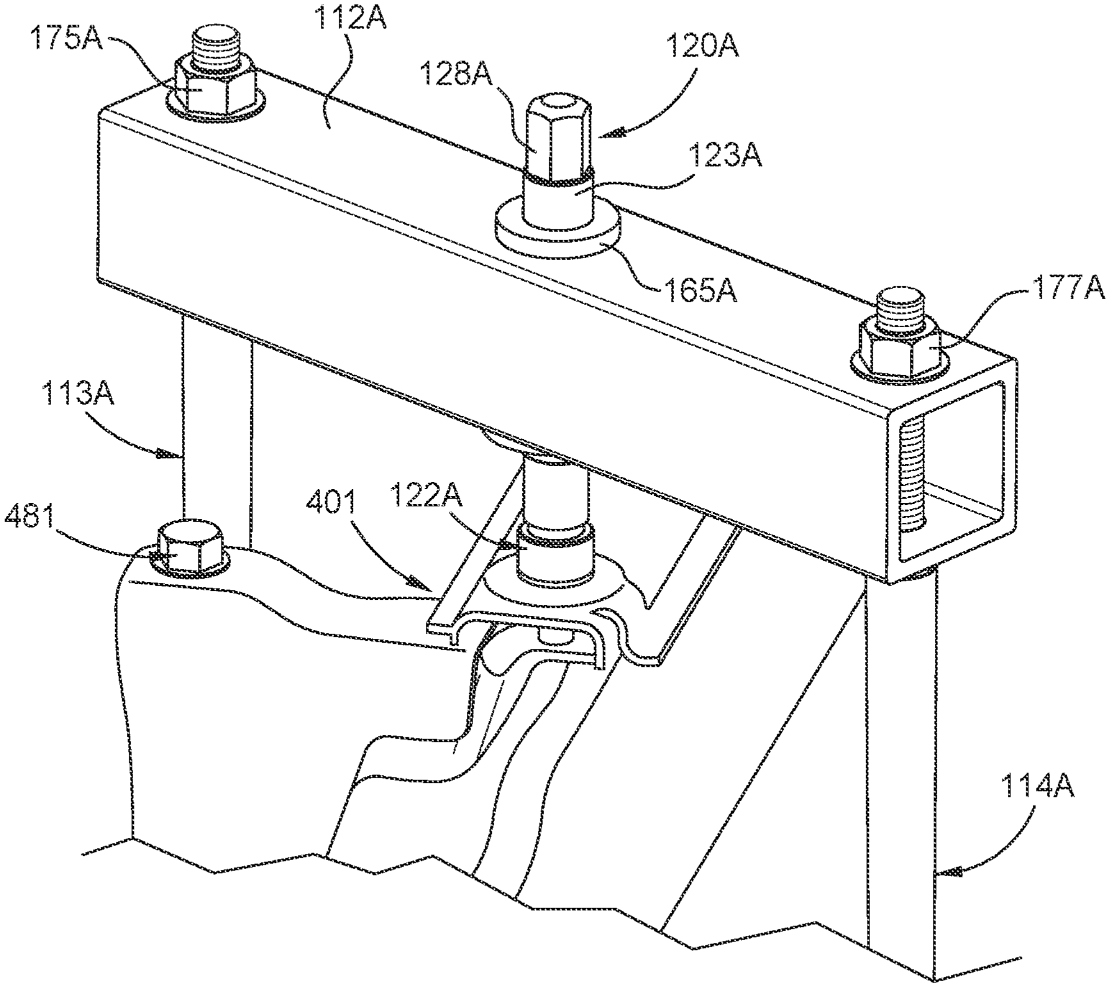

FIG. 4B is a schematic perspective view of the second block 112A, and the drive assembly 120A coupled to the second block 112A. The second block 112A is coupled to the first and second connectors 113A, 114A that are coupled to the first block 111A. The second block 112A has been positioned to extend the first connector 113A and the second connector 114A through the second block 112A and space the second block 112A from the first block 111A. The first connector 113A and the second connector 114A have been coupled to the second block 112A by turning nuts 175A, 177A onto upper end sections of the connectors 113A, 114A.

The drive assembly 120A extends through the second block 112A. As shown in FIG. 4B, the head section 128A (which can be for example, a hex head) of the drive assembly 120A is turned to abut the drive cap 122A of the drive assembly 120A against a second outer frame surface 402 (shown in FIG. 4A) of the second frame component 401. In one or more embodiments, the turning of the drive assembly 120A includes abutting the outer shoulder 154A of the drive cap 122A against the second outer frame surface 402, and inserting the tip 155A of the drive cap 122A into an opening 403 formed in the second outer frame surface 402. In one or more embodiments, the turning of the drive assembly 120A includes threading the threaded section 123A of the drive shaft 121A of the drive assembly 120A into the retention sleeve 165A that extends through the second block 112A and is coupled to the second block 112A.

After turning of the head section 128A to abut the drive cap 122A against the second outer frame surface 402, the head section 128A of the drive assembly 120A can continue to be turned. The continued turning of the head section 128A presses the drive cap 122A against the second frame component 401 and presses the engagement plate 140A against the first frame component 301 such that an item (such as a leaf spring) is compressed between the second frame component 401 and the first frame component 301. The turning of the head section 128A compresses the item (e.g., the leaf spring) such that forces on nuts of the first fasteners 381 (and/or hex heads of bolts of the second fasteners 481) are reduced or eliminated. Reducing or eliminating the forces reduces or eliminates the chances that potential energy of the spring will convert to kinetic energy in the nuts of the first fasteners 381 and/or the bolts of the second fasteners 481.

The present disclosure contemplates that operations of the method shown in FIGS. 3A-3B and 4A-4B can be performed in a different order. For example, the second block 112A can initially be positioned adjacent to the second frame component 401 with the connectors 113A, 114A and the drive assembly 120A coupled to the second block 112A, and the second block 112A can be positioned such that the tip 155A is inserted into the opening 403 such that the outer shoulder 154A abuts against the second outer frame surface 402. The first block 111A can then be positioned to extend the first end sections of the connectors 113A, 114A through the first block 111A, and the first apparatus 101A can be moved (e.g., pivoted and raised) until the protrusions 303, 304 are received in the openings 143A, 144A. The head section 128A of the drive assembly 120A can then be turned.

Figure 5:
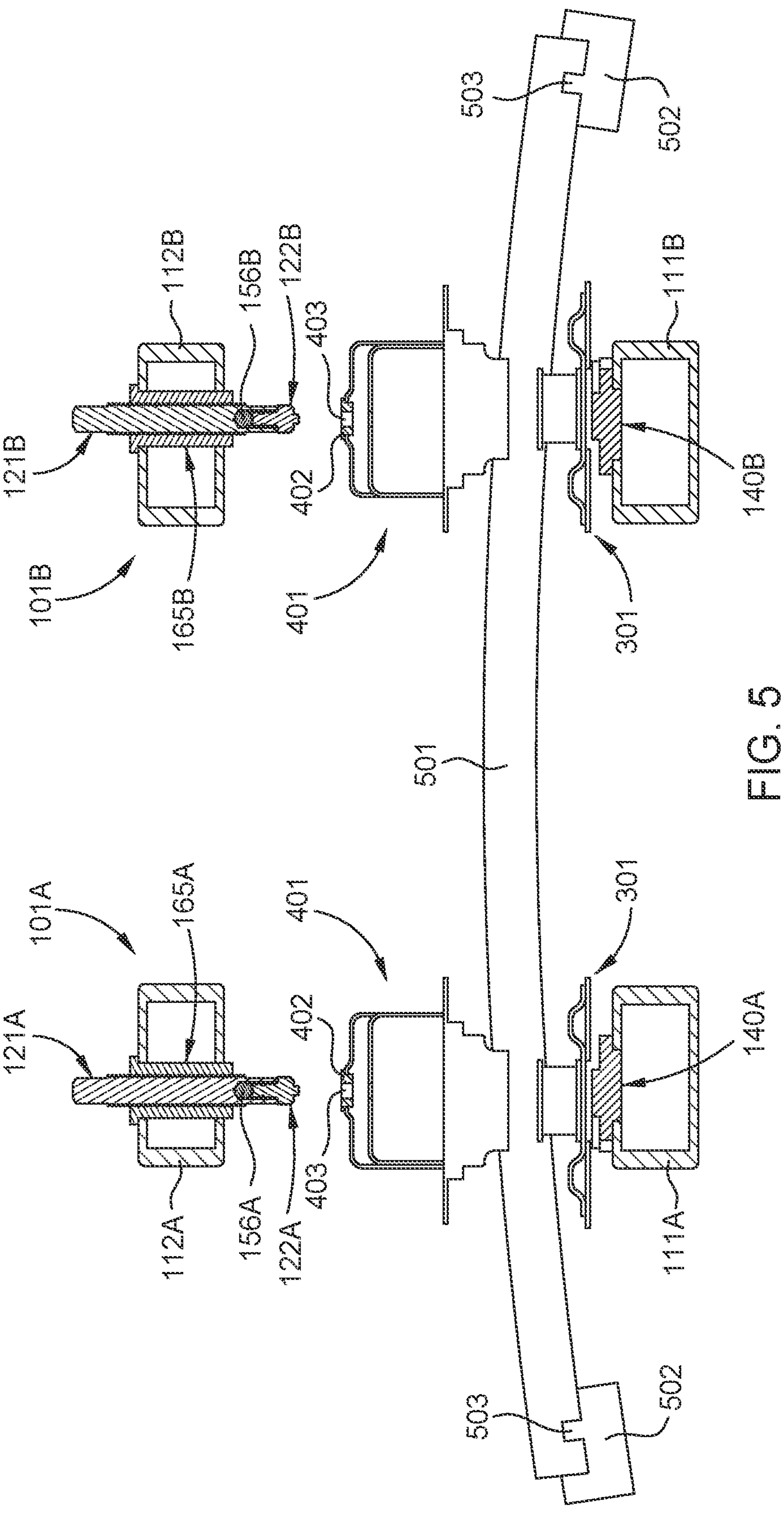
FIG. 5 is a schematic partial side cross-sectional view of the first and second apparatus of FIG. 1 positioned in relation to a leaf spring of the vehicle subframe shown in FIGS. 3A-3B and 4A-4B, according to one or more embodiments.

FIG. 5 is a schematic partial side cross-sectional view of the first and second apparatus 101A, 101B positioned in relation to a leaf spring 501 of the vehicle subframe shown in FIGS. 3A-3B and 4A-4B, according to one or more embodiments. Two first subframe components 301 and two second subframe components 401 are shown. The first subframe components 301 and the second subframe components 401 are disposed on opposite sides of the leaf spring 501.

As shown in FIG. 5, the engagement plates 140A, 140B are abutted against the first subframe components 301. The first drive shaft 121A and the second drive shaft 121B are turned to abut the drive caps 122A, 122B against the second subframe components 401, and are further turned to compress the leaf spring 501 and reduce one or more bends of the leaf spring 501. The leaf spring 501 may be coupled to one or more spring supports 502. In one or more embodiments, continuing to turn the first drive shaft 121A and the second drive shaft 121B raises the engagement plates 140A, 140B upwards against the leaf spring 501 to move sections of the leaf spring 501 upwards to compress the leaf spring 501. Compression of the leaf spring 501 may remove forces from one or more fasteners that are coupled to the leaf spring 501, such as fasteners that fasten the leaf spring 501 to one or more vehicle subframe components. Accordingly, the fasteners can be disassembled with reduced or eliminated chances of potential energy stored in the leaf spring 501 being converted into kinetic energy of fastener components.

Figure 6:
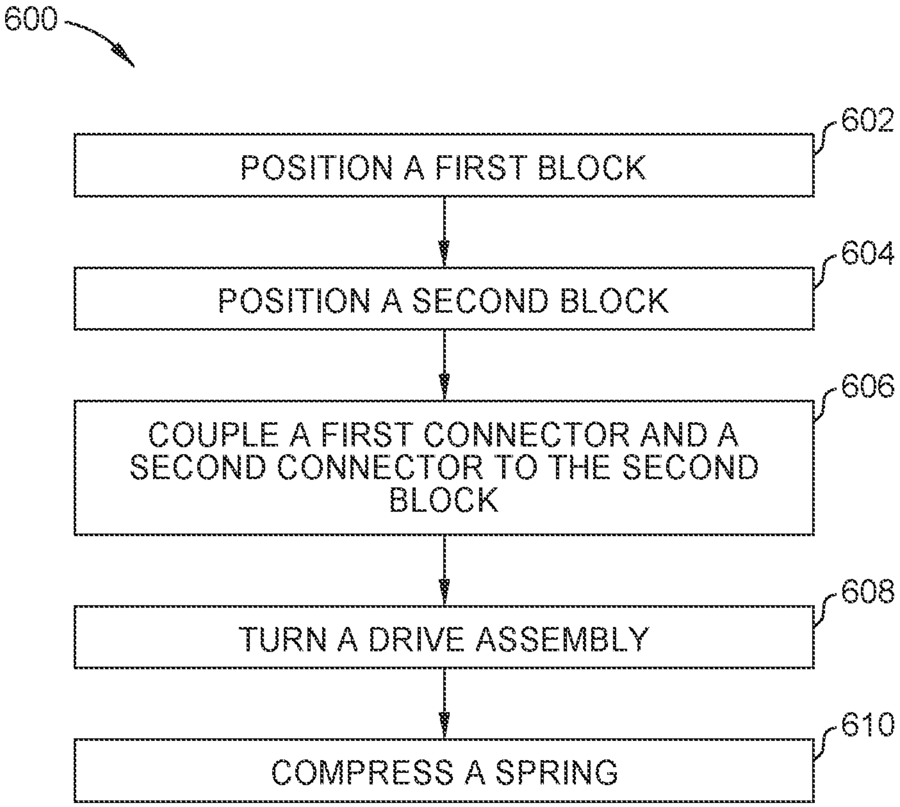
FIG. 6 is a flowchart of a method of manipulating a vehicle subframe, according to one or more embodiments.

FIG. 6 is a flowchart of a method 600 of manipulating a vehicle subframe, according to one or more embodiments. The present disclosure contemplates that one or more operations (such as some or all) described herein (such as the operations described in relation to FIGS. 4A-4B and 5A-5B) can be performed as part of the method 600.

At operation 602, a first block (e.g., block 111A, block 112A, block 111B, or block 112B) is positioned to abut an engagement plate (e.g., engagement plate 140A or engagement plate 140B) received in the first block against a first outer frame surface of a first frame component (e.g., frame component 301 or frame component 401). A first connector (e.g., first connector 113A or first connector 114A) and a second connector (e.g., second connector 113B or second connector 114B) are coupled to the first block.

At operation 604, a second block (e.g., another of block 111A, block 112A, block 111B, or block 112B) is positioned to extend the first connector and the second connector through the second block and space the second block from the first block.

At operation 606, the first connector and the second connector are coupled to the second block.

At operation 608, a drive assembly (e.g., drive assembly 120A or drive assembly 120B) that extends through the second block is turned to abut a drive cap (e.g., drive cap 122A or drive cap 122B) of the drive assembly against a second outer frame surface of a second frame component.

At operation 610, a spring (for example spring 501, such as a leaf spring) is compressed between the first frame component and the second frame component by continuing to turn the drive assembly. In one or more embodiments, the compressing of the leaf spring reduces or eliminates a force on one or more fasteners.

Benefits of the present disclosure include quickly and simply aligning equipment in relation to vehicle subframes; quickly, simply, and cost-effectively compressing items (such as leaf springs) to remove fasteners for manufacturing and/or servicing purposes; reduced costs; reduced downtime; increased manufacturing throughput and/or servicing throughput; and reduced manufacturing time and/or servicing time.

As an example, the first and second apparatus 101A, 101B facilitate disassembly of vehicle subframe components with reduced or eliminated use of equipment (such as hydraulic equipment) that can be relatively heavy and expensive. For example, the first and second apparatus 101A, 101B can be lifted and moved using the hands of operations personnel, and the drive assembly 120A can be turned manually by personnel (such as by using a wrench, for example a hex wrench). As another example, the first and second apparatus 101A, 101B can be used to reliably and quickly compress the leaf spring 501 for assembly, disassembly, and/or reassembly of at least part of the vehicle subframe.

It is contemplated that one or more aspects disclosed herein may be combined. As an example, one or more aspects, features, components, operations and/or properties of the various embodiments of the 100, the 101A, the 101B, the stages of various apparatus throughout operations of the method shown in FIGS. 3A-3B and 4A-4B, the leaf spring 501, and/or the method 600 may be combined. Moreover, it is contemplated that one or more aspects disclosed herein may include some or all of the aforementioned benefits.

While the foregoing is directed to embodiments of the present disclosure, other and further embodiments of the disclosure may be devised without departing from the basic scope thereof, and the scope thereof is determined by the claims that follow.

What is claimed is:

1. An apparatus for compressing a vehicle subframe, comprising:
- a first block;
- a second block spaced from the first block;
- a first connector extending between the first block and the second block;
- a second connector extending between the first block and the second block; and
- a drive assembly extending through the second block, the drive assembly comprising:
  - a drive shaft comprising a head section, a threaded section, and an end section, the threaded section disposed between the head section and the end section,
  - a drive cap coupled to the drive shaft, the drive cap comprising:
    - a shaft section received in a retention opening formed in the end section of the drive shaft, and
    - a head section disposed outside of the retention opening, and
  - one or more ring segments disposed partially in an inner groove of the end section of the drive shaft and partially in an outer groove of the shaft section of the drive cap.

2. The apparatus of claim 1, wherein the first connector and the second connector fixedly couple the first block to the second block.

3. The apparatus of claim 1, wherein the head section of the drive cap comprises an outer shoulder and a tip protruding relative to the outer shoulder.

4. The apparatus of claim 1, wherein the drive assembly further comprises a ball disposed between a recessed surface of the shaft section of the drive cap and a recessed inner surface of the drive shaft, and the drive shaft and the drive cap are rotatable with respect to each other.

5. The apparatus of claim 1, wherein the one or more ring segments include a seal ring.

6. The apparatus of claim 1, wherein the drive assembly further comprises a retention sleeve comprising:
- a sleeve section extending through the second block; and
- an outer shoulder section configured to abut against an outer surface of the second block.

7. The apparatus of claim 6, wherein each of the first block and the second block comprises a hollow frame.

8. The apparatus of claim 6, wherein the retention sleeve comprises a threaded inner surface, and a threaded outer surface of the threaded section of the drive shaft is threaded into the threaded inner surface.

9. The apparatus of claim 1, wherein the first connector and the second connector each comprises:

a middle section comprising a first outer shoulder configured to abut against the first block and a second outer shoulder configured to abut against the second block;

a first end section configured to extend through the first block; and a second end section configured to extend through the second block, wherein the first end section and the second end section have an outer diameter that is smaller than an outer diameter of the first outer shoulder and the second outer shoulder.

10. The apparatus of claim 1, further comprising an engagement plate received in a retention opening formed in the first block.

11. The apparatus of claim 10, wherein the engagement plate comprises:

a base section;

a first protrusion extending relative to a first side of the base section, the first protrusion received in the retention opening formed in the first block; and a second protrusion extending relative to a second side of the base section, the second protrusion of the engagement plate comprising:

a first opening formed in a planar outer surface of the second protrusion, and a second opening formed in an edge of the second protrusion.

12. A system for compressing a vehicle subframe, comprising:

a first apparatus, comprising:

a pair of first blocks spaced from each other, a plurality of first connectors extending between the pair of first blocks, a first drive assembly comprising:

a first drive shaft comprising a first head section, a first threaded section, and a first end section, the first threaded section disposed between the first head section and the first end section, and a first drive cap coupled to the first drive shaft, and a first engagement plate received in a first retention opening formed in one of the first blocks, the first engagement plate comprising:

a first alignment interface aligned along a first direction; and a second apparatus, comprising:

a pair of second blocks spaced from each other, a plurality of second connectors extending between the pair of second blocks, a second drive assembly comprising:

a second drive shaft comprising a second head section, a second threaded section, and a second end section, the second threaded section disposed between the second head section and the second end section, and a second drive cap coupled to the second drive shaft, and a second engagement plate received in a second retention opening formed in one of the second blocks, the second engagement plate comprising:

a second alignment interface aligned along a second direction that is non-parallel to the first direction.

13. The system of claim 12, wherein:

the first alignment interface comprises:

a first base section, a first protrusion extending relative to the first base section, and a plurality of first openings formed in the first protrusion, the first protrusion and the plurality of first openings oriented along the first direction; and the second alignment interface comprises:

a second base section, a second protrusion extending relative to the second base section, and a plurality of second openings formed in the second protrusion, the second protrusion and the plurality of second openings oriented along the second direction.

14. An apparatus for compressing a vehicle subframe, comprising:

a first block;

a second block spaced from the first block;

a first connector extending between the first block and the second block;

a second connector extending between the first block and the second block; and a drive assembly extending through the second block, the drive assembly comprising:

a drive shaft comprising a head section, a threaded section, and an end section, the threaded section disposed between the head section and the end section, a drive cap coupled to the drive shaft, the drive cap comprising:

a shaft section received in a retention opening formed in the end section of the drive shaft, and a head section disposed outside of the retention opening, and a ball disposed between a recessed surface of the shaft section of the drive cap and a recessed inner surface of the drive shaft, the drive shaft and the drive cap rotatable with respect to each other.

15. The apparatus of claim 14, wherein the drive assembly further comprises a retention sleeve comprising:

a sleeve section extending through the second block; and an outer shoulder section configured to abut against an outer surface of the second block.

16. The apparatus of claim 15, wherein the retention sleeve comprises a threaded inner surface, and a threaded outer surface of the threaded section of the drive shaft is threaded into the threaded inner surface.

17. An apparatus for compressing a vehicle subframe, comprising:

a first block;

a second block spaced from the first block;

a first connector extending between the first block and the second block;

a second connector extending between the first block and the second block;

a drive assembly extending through the second block, the drive assembly comprising:

a drive shaft comprising a head section, a threaded section, and an end section, the threaded section disposed between the head section and the end section, and a drive cap coupled to the drive shaft; and an engagement plate received in a retention opening formed in the first block, wherein the engagement plate comprises:

a base section;
a first protrusion extending relative to a first side of the base section, the first protrusion received in the retention opening formed in the first block; and
a second protrusion extending relative to a second side of the base section, the second protrusion of the engagement plate comprising:
a first opening formed in a planar outer surface of the second protrusion, and
a second opening formed in an edge of the second protrusion.

18. The apparatus of claim 17, wherein the drive assembly further comprises a retention sleeve comprising:
a sleeve section extending through the second block; and
an outer shoulder section configured to abut against an outer surface of the second block.

* * * * *